United States Patent [19]

Shinohara et al.

[11] Patent Number: 5,199,802
[45] Date of Patent: Apr. 6, 1993

[54] NONSEPARABLE THRUST BALL BEARING

[75] Inventors: Tsutomu Shinohara, Osaka; Susumu Takei; Shuichi Yoshino, both of Tokyo, all of Japan

[73] Assignee: Fujikin Inc., Osaka, Japan

[21] Appl. No.: 798,717

[22] Filed: Nov. 27, 1991

[30] Foreign Application Priority Data

Nov. 30, 1990 [JP] Japan ............................ 2-129996[U]
Jul. 16, 1991 [JP] Japan ............................ 3-055117[U]

[51] Int. Cl.$^5$ ........................ F16C 33/64; F16C 33/58
[52] U.S. Cl. .................................... 384/617; 384/615
[58] Field of Search ................. 384/609, 611, 615–622

[56] References Cited

U.S. PATENT DOCUMENTS

| | | | |
|---|---|---|---|
| 738,097 | 9/1903 | Caley | 384/615 |
| 822,570 | 6/1906 | Bommer | 384/615 X |
| 1,649,285 | 11/1927 | Buckwalter | 384/618 |
| 1,931,871 | 10/1933 | Large | 384/609 |
| 2,424,530 | 7/1947 | Zubler | 384/615 |
| 2,743,714 | 5/1956 | Hanson, Jr. et al. | 384/615 X |
| 3,847,456 | 11/1974 | Schwarzbich | 384/620 |
| 3,972,574 | 8/1976 | Pitner | 384/621 |
| 4,336,972 | 6/1982 | Dagiel | 384/611 |

FOREIGN PATENT DOCUMENTS 596901 1/1948 United Kingdom ................ 384/615
1517508 7/1978 United Kingdom ................ 384/615

OTHER PUBLICATIONS

FAG Kugelfischer Georg Schafer KGaA Japan.

Primary Examiner—Thomas R. Hannon
Attorney, Agent, or Firm—Armstrong, Westerman, Hattori, McLeland & Naughton

[57] ABSTRACT

A nonseparable thrust ball bearing comprising a pair of races spaced apart in the direction of axis of rotation, a plurality of balls rollable between the races, and a connecting ring rotatably interconnecting the inner peripheries of the races. The ring comprises a hollow cylinder portion, and outer flanges formed at the respective ends of the cylinder portion generally at a right angle therewith and in engagement with the respective races. The cylinder portion is fitted at one end thereof in the corresponding one of the races with a clearance formed therebetween, and the flange of the ring at said one end thereof is fitted in a cutout formed in the corresponding race, with a clearance provided in the cutout around the flange.

2 Claims, 2 Drawing Sheets

NONSEPARABLE THRUST BALL BEARING

BACKGROUND OF THE INVENTION

The present invention relates to nonseparable thrust ball bearings for use in pipe joints and the like.

Nonseparable thrust ball bearings are used in pipe joints to achieve an improved work efficiency by eliminating conjoint rotation of the two joint members and reducing the fastening torque, and to prevent defacement of the gasket to be interposed between the two joint members.

Such thrust ball bearings already known include those comprising a pair of races spaced apart in the direction of axis of rotation, a plurality of balls rollable between the two races, and a connecting ring rotatably connecting the two races together. The ring is provided at its respective ends with tapered retaining portions engaging with tapered faces of the respective races for preventing slipping off (see Unexamined Japanese Utility Model Publication SHO 63-177380).

With the conventional nonseparable thrust ball bearing described, each tapered retaining portion of the connecting ring is in engagement with the race, so that the ring is connected to the race by a portion of diminished area. This involves the following problem.

When the balls are to be held between the two races reliably, the retaining portions of the ring need to be firmly held pressed against the races, consequently impeding smooth rotation. Conversely, if it is attempted to obviate the objection and ensure smooth rotation, the races are liable to separate from the balls because the connection between the retaining portion of the connecting ring and the race is diminished.

SUMMARY OF THE INVENTION

The main object of the present invention is to provide a nonseparable thrust ball bearing wherein the components are smoothly rotatable, and the races are less likely to separate from the balls.

The present invention provides a nonseparable thrust ball bearing which comprises a pair of races spaced apart in the direction of axis of rotation of the bearing, a plurality of balls rollable between the pair of races, and a connecting ring rotatably interconnecting the inner peripheries of the pair of races, the connecting ring comprising a cylinder portion, and outer flanges formed at the respective ends of the cylinder portion approximately at a right angle therewith and in engagement with the respective races, the cylinder portion of the connecting ring being fitted at one end thereof in the corresponding one of the races with a clearance formed therebetween, the flange of the connecting ring at said one end thereof being fitted in a cutout formed in the corresponding race, with a clearance provided in the cutout around the flange.

The connecting ring cylinder portion has an outer flange formed at each of its opposite ends approximately at a right angle therewith and engaging with the race, so that the flanges are connected to the respective races over an increased area, reliably preventing separation of the balls from the races. Furthermore, the cylinder portion of the connecting ring is fitted at one end thereof in the corresponding one of the races with a clearance formed therebetween, and the flange of the connecting ring at said one end thereof is fitted in a cutout formed in the corresponding race, with a clearance formed in the cutout around the flange. At the portion of the cutout, one of the races is freely rotatable relative to the connecting ring, i.e., to the other race. Thus assures smooth rotation.

According to an embodiment of the invention, the cylinder portion of the connecting ring is fitted at the other end thereof in the corresponding other race with a clearance formed therebetween, and the flange of the connecting ring at the other end thereof is fitted in a cutout portion formed in the corresponding other race, with a clearance provided in the cutout portion around the flange.

With this arrangement, the two races are freely rotatable relative to the connecting ring very smoothly.

The connecting ring may be fixed at the other end thereof to the corresponding other race. The other race is then prevented from moving relative to the ring, precluding separation of the balls from the races more reliably.

In this case, the flange of the connecting ring at the other end thereof may be fitted in a cutout portion formed in the corresponding other race in pressing contact with a corner of the cutout portion and thereby fixed to the other race.

According to another embodiment of the invention, the cylinder portion of the connecting ring is fitted at the other end thereof in the corresponding other race in intimate contact therewith, and the flange of the connecting ring at the other end thereof is fitted in a cutout portion formed in the corresponding other race in pressing contact with a side face of the cutout portion, whereby the connecting ring is fixed at the other end thereof to the other race.

According to another embodiment, the cylinder portion of the connecting ring is fitted at the other end thereof in the corresponding other race in intimate contact therewith, and the flange of the connecting ring at the other end thereof is in contact with the outer side surface of the corresponding other race, whereby the connecting ring is fixed at the other end thereof to the other race.

DESCRIPTION OF THE PREFERRED EMBODIMENTS

Several embodiments of the invention will be described below with reference to the drawings. In the following description, the terms "right" and "left" are used based on the illustration.

Figure 1:
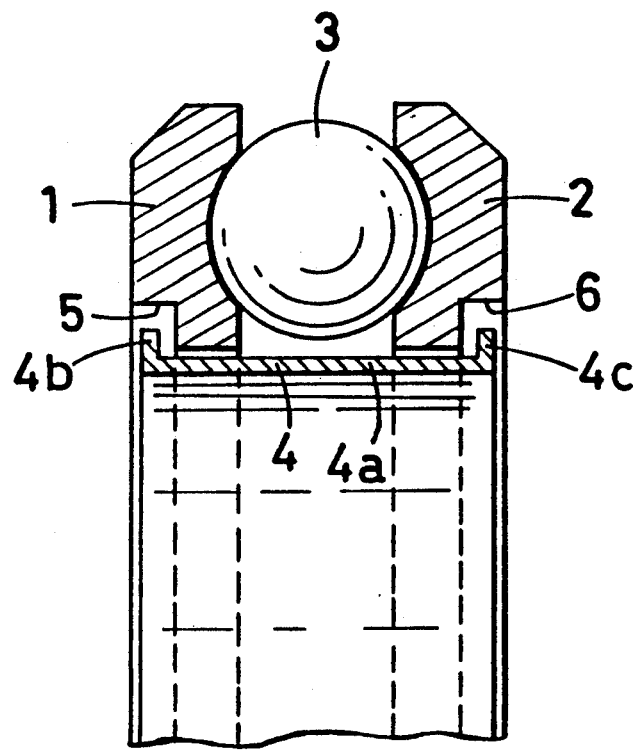
FIG. 1 is a view in vertical section showing a first embodiment of nonseparable thrust ball bearing of the invention.

FIG. 1 shows a first embodiment.

The illustrated thrust ball bearing comprises a pair of races 1 and 2 spaced apart in the direction of axis of rotation of the bearing, a plurality of balls 3 rollable between the races 1, 2, and a connecting ring 4 rotatably interconnecting the inner peripheries of the two races 1, 2.

The connecting ring 4 comprises a hollow cylinder portion 4a, and outer flanges 4b, 4c formed at the respective ends of the cylinder portion integrally therewith and in engagement with the respective races 1, 2. At the inner peripheries of the races 1, 2, the outer surfaces, facing toward opposite directions, of the races are cut out perpendicular to a direction parallel to the axis of rotation to form cutout portions 5, 6. The cylinder portion 4a of the ring 4 has an outside diameter slightly smaller than the inside diameter of the races 1, 2, and is fitted in the races 1, 2 with a clearance formed around the portion 4a. The distance between the outer surfaces of the opposed flanges 4b, 4c is slightly smaller than the outer width of assembly of the races 1, 2 in pressing contact with the balls 3. The distance between the opposed inner surfaces of the flanges 4b, 4c is slightly larger than the distance between the outer surfaces of the cutout portions 5, 6 of the races 1, 2 in pressing contact with the balls 3. The flanges 4b, 4c are fitted in the respective cutout portions 5, 6 with a clearance formed in the portions 5, 6. At least one of the flanges 4b, 4c is formed by crimping or like suitable method after the ring 4 has been inserted through the assembly of races 1, 2 with the balls 3 interposed therebetween.

In this case, the outer flanges 4b, 4c of the connecting ring 4 are formed at the respective ends of the cylinder portion 4a approximately at a right angle therewith, and fitted in the cutout portions 5, 6 formed in the inner peripheries of the races 1, 2 on the outer surfaces thereof, so that the flanges 4b, 4c are connected to the respective races 1, 2 over an increased area. This reliably prevents separation of the balls 3 from the races 1, 2. Furthermore, the cylinder portion 4a of the ring 4 is fitted in the two races 1, 2 with a clearance formed around the portion 4a inside the races, and the flanges 4b, 4c at opposite ends of the ring 4 are loosely fitted in the cutout portions 5, 6 formed in the races 1, 2. This permits the races 1, 2 to freely and very smoothly rotate relative to the connecting ring 4.

Figure 2:
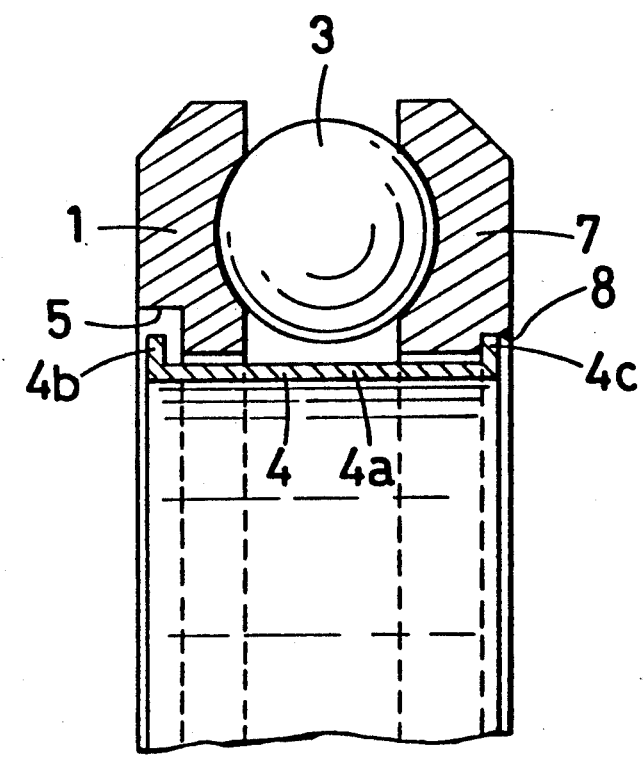
FIG. 2 is a view in vertical section showing a second embodiment of nonseparable thrust ball bearing of the invention.
Figure 3:
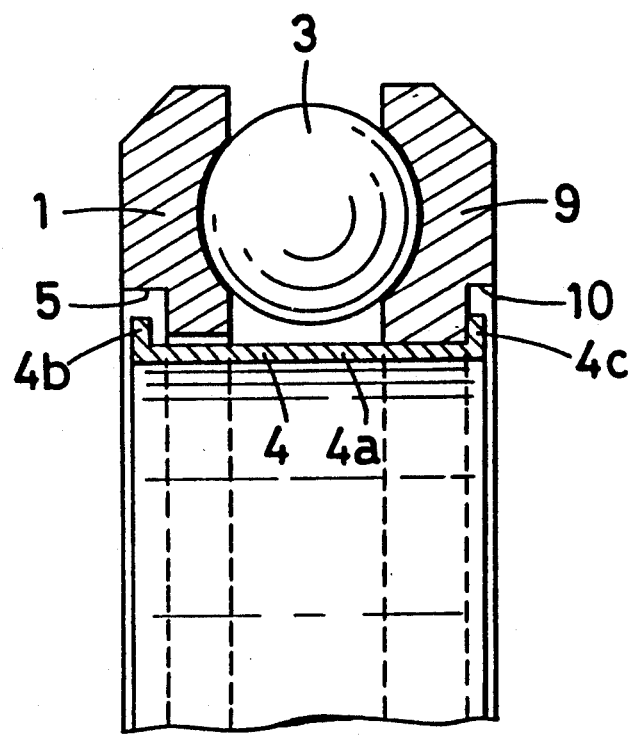
FIG. 3 is a view in vertical section showing a third embodiment of nonseparable thrust ball bearing of the invention.
Figure 4:
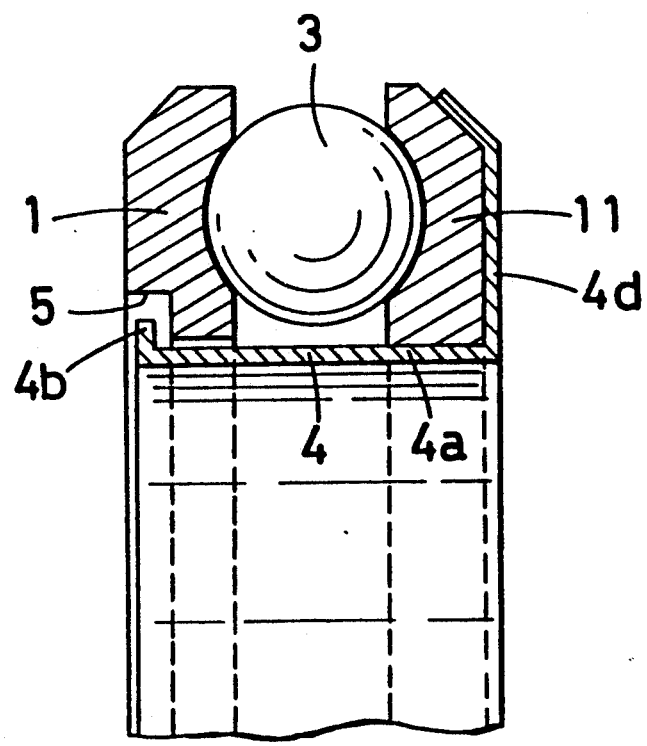
FIG. 4 is a view in vertical section showing a fourth embodiment of nonseparable thrust ball bearing of the invention.

FIGS. 2, 3 and 4 show other embodiments. Throughout FIGS. 1 to 4, like parts are designated by like reference numerals. These embodiments are the same as the first embodiment with respect to the dimensional relation of the cylinder portion 4a and the left flange 4b of the connecting ring 4 to the left race 1 and the left cutout portion 5. The cylinder portion 4a is fitted in the left race 1 with a clearance formed therebetween, and the left flange 4b is fitted in the left cutout portion 5 with a clearance formed inside the portion 5.

With reference to FIG. 2 showing the second embodiment, a right cutout portion 8 is smaller than the left cutout portion 5 in inside diameter, and the width of the right cutout portion 8 is slightly larger than the thickness of the right flange 4c. The right flange 4c is held in pressing contact with a corner of the right cutout portion 8 by crimping or like suitable method, whereby the connecting ring 4 is fixed to a right race 7.

With reference to FIG. 3 showing the third embodiment, the inside diameter of a right race 9 is approximately equal to the outside diameter of the cylinder portion 4a, and the width of a right cutout portion 10 is slightly larger than the thickness of the right flange 4c. The cylinder portion 4a of the connecting ring 4 is fitted in the right race 9 in intimate contact therewith, and the right flange 4c is pressed into contact with the side face of the right cutout portion 10 by crimping or like suitable method, whereby the connecting ring 4 is fixed to the right race 9.

With reference to FIG. 4 showing the fourth embodiment, a right race 11 has an inside diameter approximately equal to the outside diameter of the cylinder portion 4a and is formed with no cutout portion. The length of the right flange 4d is equal to the length of the right side surface (outer side surface) of the right race 11 plus the length of a slope extending from the side surface. The connecting ring 4 is fitted in the right race 11 in intimate contact therewith, and the right flange 4d is formed by being so bent as to contact the right side surface of the right race 11 and the slope extending therefrom, whereby the ring 4 is fixed to the right race 11.

In the case of the second, third and fourth embodiments, the right end of the connecting ring 4 is fixed to the right race 7, 9 or 11, so that the movement of the right race 7, 9 or 11 relative to the ring 4 is suppressed. This prevents separation of the balls 3 from the races 1, and 7, 9 or 11. Because the cylinder portion 4a is fitted in the left race 1 with a clearance formed therebetween and further because the left flange 4b is fitted in the left cutout portion 5 with a clearance left therein, the left race 1 is freely and smoothly rotatable at the left portion of the assembly relative to the connecting ring 4, and accordingly to the right race 2.

What is claimed is:

1. A nonseparable ball bearing comprising a pair of races spaced apart in the direction of axis of rotation of the bearing, a plurality of balls rollable between the pair of races, and a connecting ring rotatably interconnecting the inner peripheries of the pair of races, the connecting ring comprising a hollow cylinder portion, and outer flanges formed at the respective ends of the cylinder portion approximately at a right angle therewith and in engagement with the respective races, the cylinder portion of the connecting ring being fitted at one end thereof in the corresponding one of the races with a clearance formed therebetween, the flange of the connecting ring at said one end thereof being fitted in a cutout formed in the corresponding race, with a clearance provided in the cutout around the flange, wherein the cylinder portion of the connecting ring is fitted at the other end thereof in the corresponding other race with a clearance formed therebetween, and the flange of the connecting ring at the other end thereof is fitted in a cutout portion formed in the corresponding other race, with a clearance provided in the cutout portion around the flange.

2. A nonseparable ball bearing comprising a pair of races spaced apart in the direction of axis of rotation of the bearing, a plurality of balls rollable between the pair of races, and a connecting ring rotatably interconnecting the inner peripheries of the pair of races, the connecting ring comprising a hollow cylinder portion, and first and second outer flanges formed at the respective ends of the cylinder portion approximately at a right angle therewith and in engagement with the respective races, the cylinder portion of the connecting ring being fitted at one end thereof in the corresponding one of the races with a clearance formed therebetween, the first flange of the connecting ring at said one end thereof being fitted in a cutout formed in the corresponding race, with a clearance provided in the cutout around the flange, wherein the cylinder portion of the connecting ring is fitted at the other end thereof in the corresponding other race in intimate contact therewith, and the second flange of the connecting ring at the other end thereof has a first portion extending a first length from said cylinder portion, a bent portion, and a second portion, wherein said first portion is connected by said bent portion to said second portion so that said second portion is inclined at an acute angle toward said first flange and is held in contact with the outer side surface of the corresponding other race along the length of the first portion and the second portion, whereby the connecting ring is fixed at the other end thereof to the other race.

* * * * *